April 6, 1926.
H. J. LE VESCONTE
PNEUMATIC TIRE PRESSURE GAUGE
Filed Nov. 11, 1922
1,579,547
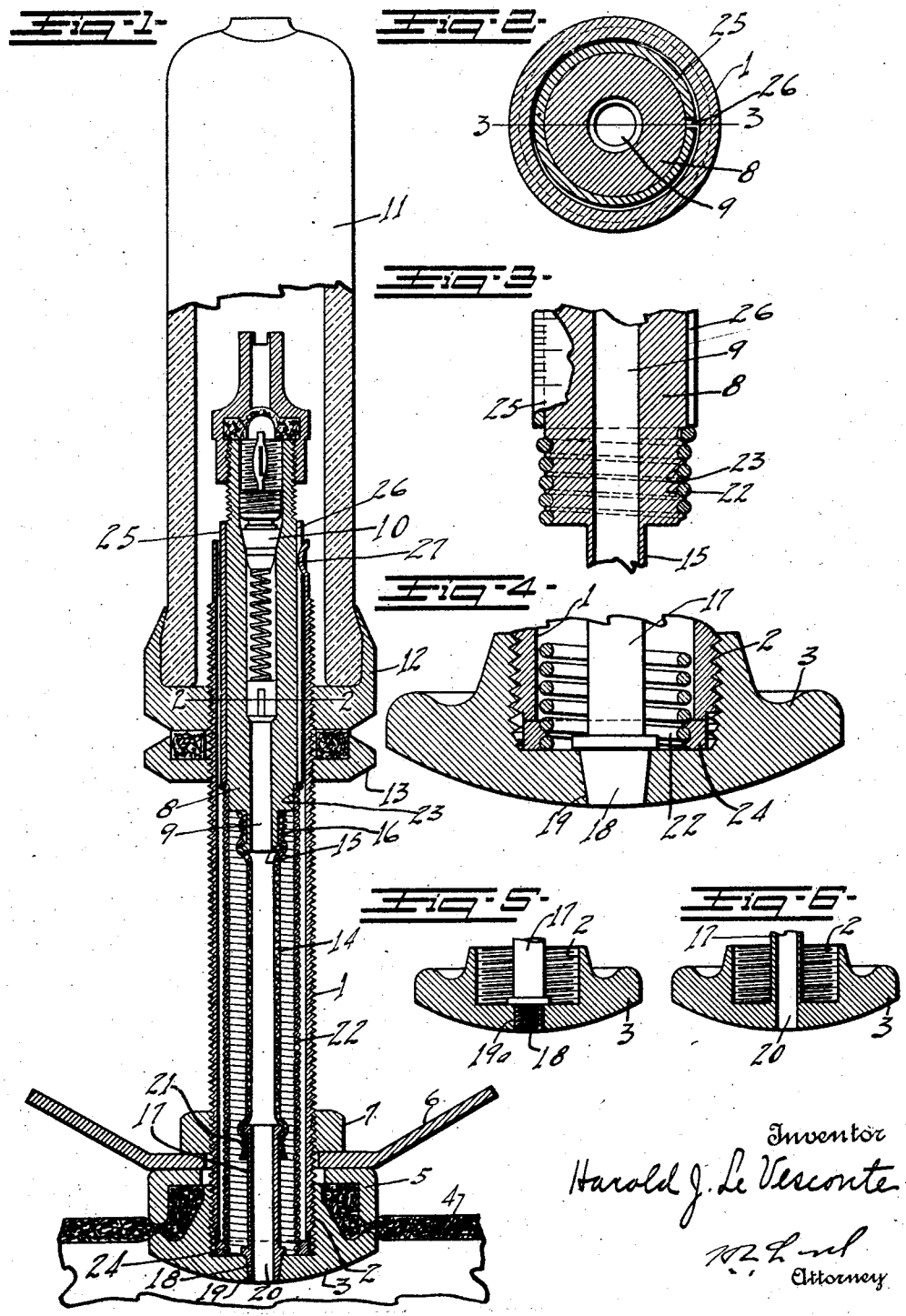
Inventor
Harold J. Le Vesconte
Attorney Patented Apr. 6, 1926.

1,579,547

UNITED STATES PATENT OFFICE.

HAROLD J. LE VESCONTE, OF CHARLESTON, WEST VIRGINIA, ASSIGNOR, BY MESNE ASSIGNMENTS, TO TIREGAGE VALVE CORPORATION, OF CHARLESTON, WEST VIRGINIA, A CORPORATION OF WEST VIRGINIA.

PNEUMATIC-TIRE PRESSURE GAUGE.

Application filed November 11, 1922. Serial No. 600,419.

*To all whom it may concern:*

Be it known that I, HAROLD J. LE VESCONTE, a citizen of the United States, residing at Charleston, in the county of Kanawha and State of West Virginia, have invented new and useful Improvements in Pneumatic-Tire Pressure Gauges, of which the following is a specification.

This invention is designed to improve the construction of pneumatic pressure gauges in the manner to facilitate the assembling of the same and to make the same more certain as against leakage.

The invention is illustrated in the accompanying drawings as follows:—

Fig. 1 shows a central section through the gauge.

Fig. 2 a section on the line 2—2 in Fig. 1.

Fig. 3 a section on the line 3—3 in Fig. 2.

Fig. 4 an enlarged section of the base of the gauge.

Figs. 5 and 6 alternative constructions.

1 marks the tire stem sleeve. This is preferably of uniform internal diameter and is externally screw-threaded. It is screwed into an outwardly opening socket 2 in a head 3. A tire tube 4 is clamped between the head 3 and a clamping plate 5. The spreader 6 is provided and the clamping plate and spreader clamped in position by a clamping nut 7.

A plunger 8 is slidingly mounted in the sleeve 1. This has an opening 9 extending through it which is controlled by an inflation valve 10. The position of the plunger indicates the pressure in the valve and a transparent cap 11 is provided for the end of the stem through which the position of the plunger may be observed. The cap 11 has a glass outer end and a metallic base 12, the metallic base being screwed on to the sleeve 1. The usual felloe nut 13 is provided.

A rubber tube 14 is arranged over an extension 15 on the bottom of the plunger and secured thereon by a wrapping 16. A nipple 17 is provided with a cone-shaped end 18 which is pressed into a cone-shaped opening 19 in the base 3 and secured there by soldering so as to make an air tight joint. The nipple has an opening 20 through it so that there is a connection through the plunger, tube and nipple to the interior of the tire. The lower end of the tube 14 is secured to the upper end of the nipple 17 by a wrapping 21.

A spring 22 is screwed into threads 23 on the end of the plunger and is screwed into an internally screw-threaded nut 24 at its lower end. The nut is arranged under the end of the sleeve 1 and is clamped in the bottom of the socket 2 when the sleeve is screwed into place.

A sleeve-like shell 25 is arranged around the plunger, its meeting edges being separated slightly at 26 forming a key-way into which the key 27 formed by indenting the upper end of the sleeve operates to lock the plunger against turning. The sleeve after it is in place is preferably secured by solder. The upper end of the spring 22 closes the lower end of the key-way and forms a stop against which the key 27 operates so as to prevent the escape of the plunger in case of injury to the tube and spring. The shell 25 is preferably graduated, the shell facilitating the forming of the scale thereon.

In assembling the structure the rubber tube is bound on the plunger extension. The internally screw-threaded nut 24 is screwed on to the lower end of the spring and the spring is screwed over the plunger. The lower end of the tube is pulled free of the spring and secured to the nipple 18, the nipple having been previously secured in the head. The sleeve 1 is then slipped over the assembled plunger, spring and tube and screwed into place in the socket 2, thus securely anchoring and clamping the nut 24 in the bottom of the socket. It is locked in place by any desired method such as indenting, crimping, or welding. The sleeve 25 is then slipped in place, the slot 26 permitting it to slide along the key 27 and when brought to its desired position is secured by soldering.

In the alternative construction the nipple 17 has a screw-threaded end 18ª which is screwed into an opening 19ª and in the construction shown in Fig. 6 the nipple 17 is integral with the head.

What I claim as new is:—

1. In a pneumatic tire pressure gauge, the combination of a sleeve externally screw-threaded; a head having a screw-threaded outwardly opening socket into which the sleeve is screwed; a plunger slidingly mounted in the sleeve; a valve in the plunger; a tube connecting the plunger with the interior of the gauge; a spring resisting the movement of the plunger, said plunger, tube and spring being adapted to be assembled in the socket and secured therein by screwing into the socket the screw-threaded sleeve; a shell secured on the plunger having its edges separated forming a key-way, said shell being insertable between the sleeve and plunger after the assembly of the sleeve and head; and a key on the sleeve extending into the key-way.

2. In a pneumatic tire pressure gauge, the combination of a stem sleeve; a sliding plunger in the sleeve; a spring arranged over the end of the plunger and resisting its movement; a graduated metallic shell arranged over the plunger having its edges slightly separated forming a key-way, one end of the key-way being closed by the spring; and a key on the sleeve extending into the key-way, the spring forming a stop in connection with the key.

3. In a pneumatic tire pressure gauge, the combination of a sleeve externally screw-threaded; a head having a screw-threaded outwardly opening socket into which the sleeve is screwed; a plunger slidingly mounted in the sleeve; a valve in the plunger; a tube connecting the plunger with the interior of the gauge; a spring resisting the movement of the plunger, said plunger, tube and spring being adapted to be assembled in the socket and secured therein by screwing into the socket the screw-threaded sleeve; a shell secured on the plunger having its edges separated forming a key-way, said shell being insertable between the sleeve and plunger after the assembly of the sleeve and head; a key on the sleeve extending into the key-way; and a nut screwed on to the inner end of the spring and anchored in the head by the assembling of the sleeve in the socket.

In testimony whereof I have hereunto set my hand.

HAROLD J. LE VESCONTE.